Jan. 2, 1923.

C. L. FITZ.
OZONE GENERATOR FOR WATER PURIFICATION.
FILED OCT. 18, 1920.

CHARLES LEO FITZ
INVENTOR.

BY Victor J Evans
ATTORNEY.

Jan. 2, 1923.

C. L. FITZ.
OZONE GENERATOR FOR WATER PURIFICATION.
FILED OCT. 18, 1920.

CHARLES LEO FITZ
INVENTOR

BY Victor J. Evans
ATTORNEY

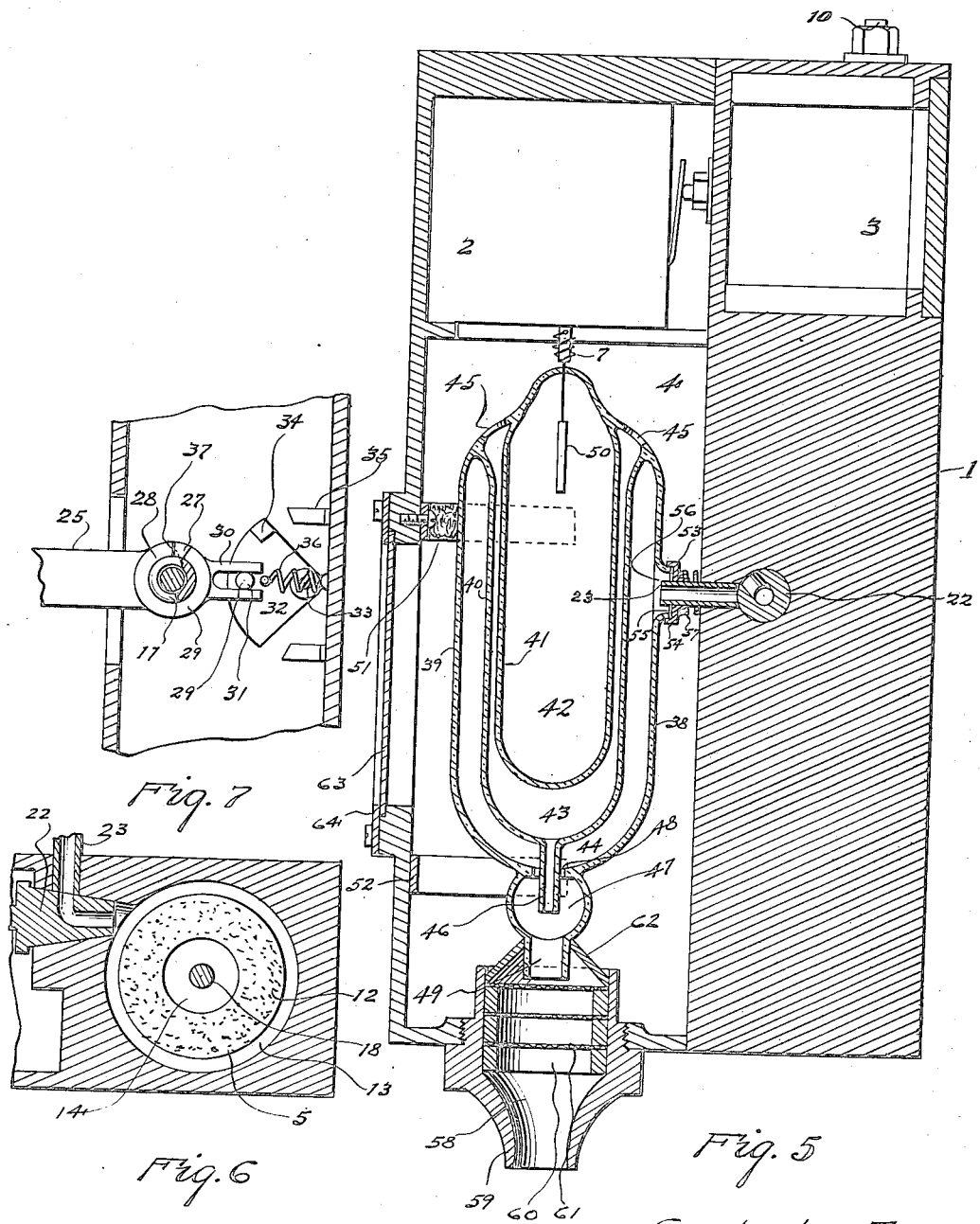

Patented Jan. 2, 1923.

1,441,075

UNITED STATES PATENT OFFICE.

CHARLES LEO FITZ, OF FOND DU LAC, WISCONSIN.

OZONE GENERATOR FOR WATER PURIFICATION.

Application filed October 18, 1920. Serial No. 417,635.

*To all whom it may concern:*

Be it known that I, CHARLES LEO FITZ, a citizen of Hungary, residing at Fond du Lac, in the county of Fond du Lac and State of Wisconsin, have invented new and useful Improvements in Ozone Generators for Water Purification, of which the following is a specification.

This invention relates to an ozone generator and has for its primary object the construction of a simple, inexpensive apparatus by means of which drinking water will be completely filtered and subjected to a charging action of ozone gas, which has the properties to carbonize batogamic as well as the low water germs which are well known in the medical profession.

An object of the invention is the construction of an apparatus that may be readily installed in a residence or office and may receive its ordinary water supply from the regular pipes and in such a manner that by simply operating a single lever the flow of water is controlled and the charging thereof automatically accomplished.

Another object of the invention is the compact arrangement of the parts whereby water will be first filtered, then subjected to the charging action of the gas, and then mixed with ozone so that water passing from the apparatus will be absolutely pure and germ free.

A further object of the invention is the novel construction of the tube so that all the water will be subjected to the gas generated and in such a manner that the charging is completed with the minimum consumption of current.

A further object of the invention is the fact that the water is so passed through the tube that the water forms a positive electric ground for the tube which will increase the ozone generating action of the tube.

A still further object of the invention is the arrangement of a mixing chamber controlled by the tube so that the passing water will be disturbed in a manner as to assure complete mixing of the ozone with the water and besides to subject every molecule of the water to the action of the gas for destroying bacteria.

A feature of the invention is the novel manner of constructing and associating the parts so that the electric discharge may be viewed by the operator which adds to the novelty of the apparatus.

With these and other objects in view the invention will be better understood from the following detailed description taken in connection with the accompanying drawings wherein:

Fig. 5 is a vertical sectional view looking in another direction.

Fig. 6 is a horizontal view.

Fig. 7 is a detailed view of the switch.

Figs. 9, 10, 11, 12, 13, and 14 are detailed views of the switch.

Figure 15:
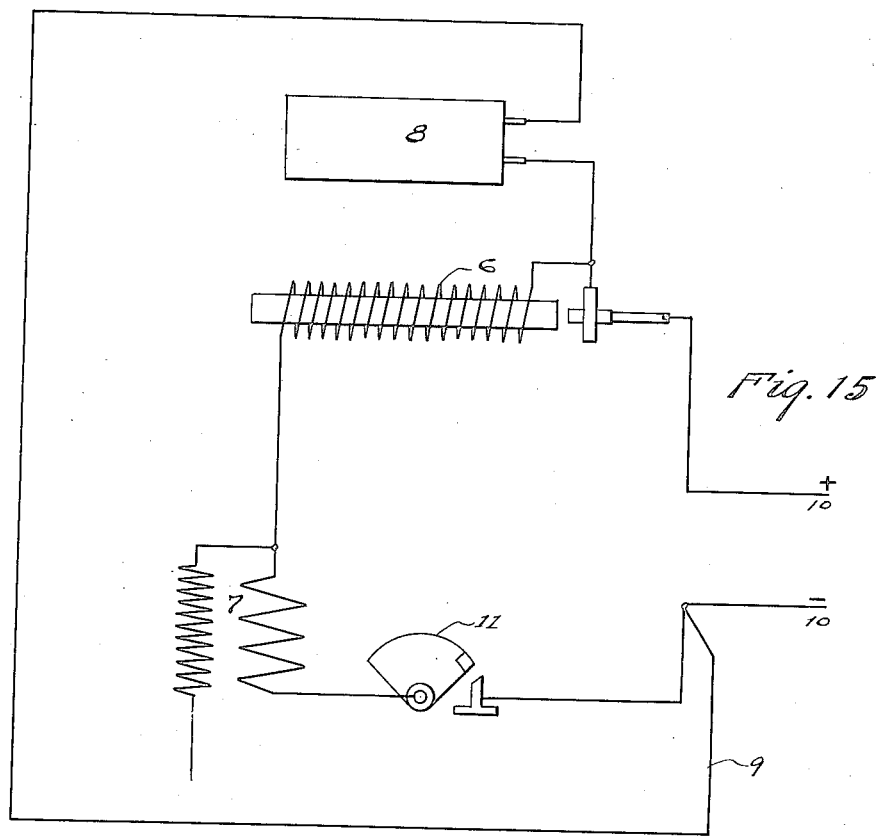
Figure 8:
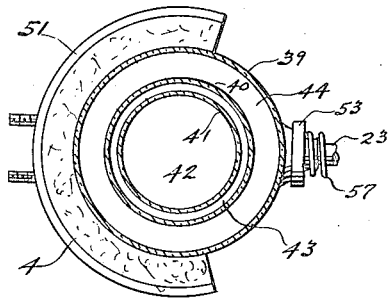
Fig. 8 is a horizontal sectional view through the tube.

Fig. 15 is a diagrammatic view of the high frequency devices.

Figure 1:
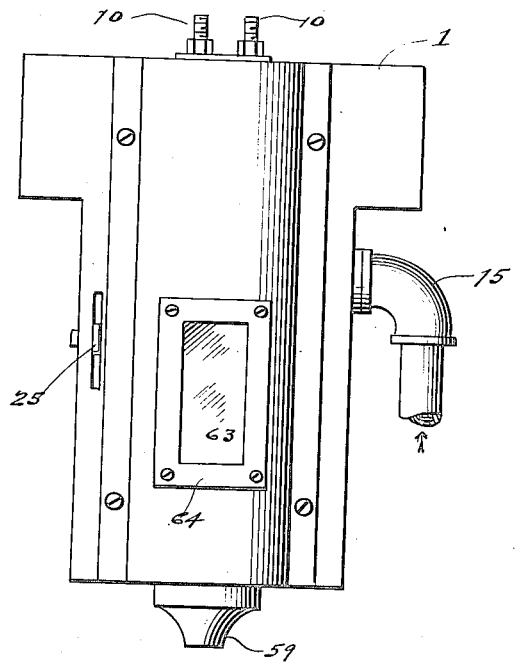
Fig. 1 is a front elevation of the apparatus.
Figure 2:
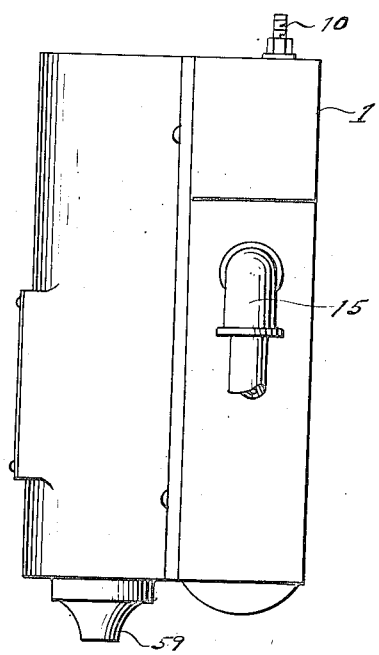
Fig. 2 is a side elevation.
Figure 3:
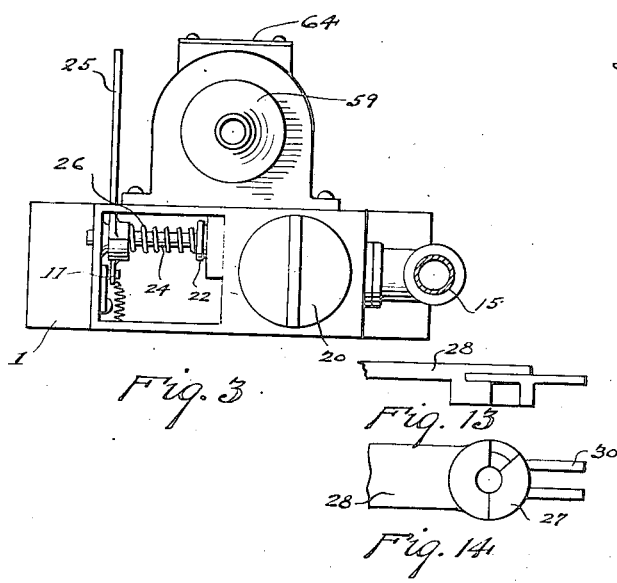
Fig. 3 is a bottom plan view.
Figure 9:
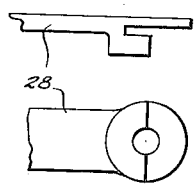
Figure 10:
Figure 11:
Figure 12:
Figure 4:
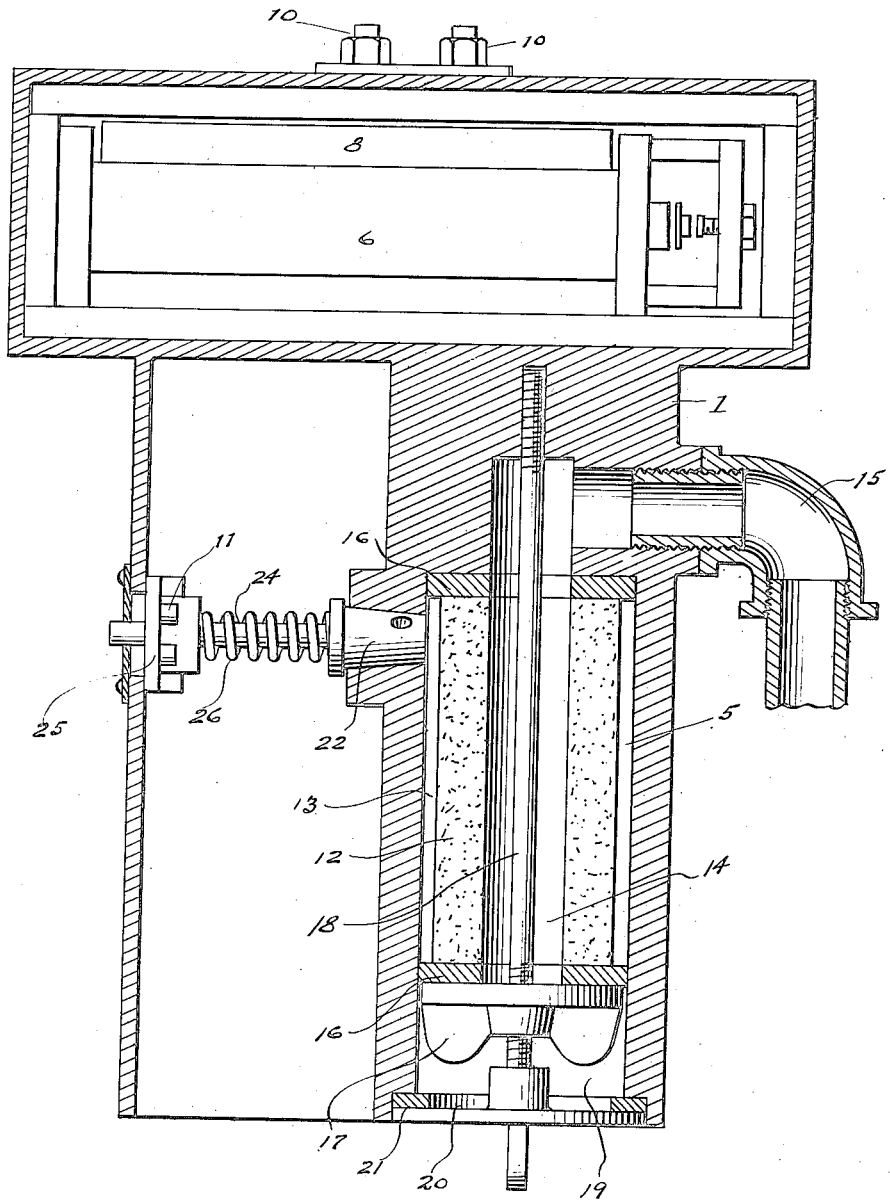
Fig. 4 is a vertical sectional view looking in one direction.

Again referring to the drawing illustrating one of the many constructions of my invention the numeral 1 designates a casing that is to be supported upon the wall or any other convenient position to have the parts within the casing readily operated. This casing 1 has its interior formed into a pair of upper compartments 2 and 3, a gas generating compartment 4 and a filtration compartment 5. Arranged in the upper compartments are the high frequency generating devices clearly illustrated in the diagram Fig. 15. It is, of course, to be understood any high frequency devices now on the market may be used but for the purpose of illustration I have shown an interrupted coil 6, an induction coil 7, and a condenser 8 arranged in a circuit 9 connected to the terminals 10 which are connected to the mains. A switch 11, hereinafter described, controls the operation of these devices. In the filtration chamber I arrange a porous tube 12 which co-operates with the wall of the compartment to form a filtration chamber 13 and water chamber 14. Chamber 14 communicates with the water pipe 15. Engaging opposite ends of the tube 12 are gasket rings 16 held in place by the thumb nut 17 having screw threaded engagement with the rod 18. By referring to Fig. 4 it will be seen that the recess 19 is arranged below the thumb nut 17 to receive sediment and this recess is closed by the thumb nut 20 also screw threaded to the rod and engaging the gasket 21. A plug valve 22 controls the flow of water from the chamber 13 to a pipe section 23. The stem 24 of this valve has connection with the lever 25 projecting beyond the casing so as to be manipulated. A coil spring 26 is arranged to hold the valve properly seated.

Associated with this lever is a switch 11 operated in a manner now to be described. The numeral 27 designates a clutch, one member 28 of which is fixed to the lever the other member 29 of which is loosely mounted and provided with a forked arm 30 co-operating with the pin 31 on the segmental switch 32. This switch is pivotally mounted as indicated at 33 so that the contact 34 may move into engagement with the stationary contact 35. A coil spring 36 is connected that when in normal position it assumes a position in alignment with pin 31 and pivot 33 so that when the switch is partly moved the spring will snap the switch into engagement with contact 35. The co-operation of the shoulders 37 of the clutch and the fact that the member 29 is loose allows the spring to snap the switch into engagement with contact 36 while at the same time allowing the switch to be returned to normal position in the return of the lever.

By this construction it will be seen that in the initial movement of the lever 25 the switch will be immediately closed so as to start the generating of gas, in a manner hereinafter described, before the valve 22 is fully opened to allow the passage of water and thus it will be seen that every particle of water passing will be properly charged.

An important part of my invention is the tube 38, especially constructed to subject the water to the greatest possible charging action with the minimum consumption of current. This tube is constructed to provide three walls, 39, 40 and 41 co-acting to form the electric discharge chamber 42, the gas chamber 43, and the water chamber 44. The wall 39 is provided with inlets 45 to allow the passage of air to chamber 43 where the same is acted upon by the electric discharger to form ozone gas. A tubular extension 46 establishes communication between chamber 43 and the mixing chamber 47 that is arranged in communication with chamber 44 by the opening 48. A neck 49 extends from the syphon chamber and thus it will be seen that water passing from compartment 44 into chamber 47 will cause a suction action which draws gas from chamber 43 and allows complete mixture thereof with the water passing from the neck 49. The pole 50 of the tube is electrically connected to the coil 7 so as to be subjected to the high frequency currents. Brackets 51 and 52, constructed in any suitable manner, engage the tube for holding same in place and for allowing expansion and contraction of the tube and, further, to prevent breaking of the same I have illustrated an adjustable connection 53 between the pipe section 23 and the tube. This adjustable connection consists of a cup 54 slidably mounted on the tube and supporting a gasket 55 which engages around the inlet 56 of the tube. This cup is pressed by the spring 57 into engagement with the tube. As the water passes from the tube it is delivered into any suitable receptacle through an ozone mixing chamber 58 consisting of a nozzle 59 screw threaded to the casing and supporting a series of rings 60 clamping in place strainers 61. A cone 62 clamps the neck 49 in proper position with relation to the strainers.

To complete the invention I provide a sight glass 63 clamped in the proper position by the plate 64 so that the electric discharges of the tube may be viewed by the operator.

From the foregoing description taken in connection with the accompanying drawing it will be apparent that I provide an apparatus of a relatively simple, inexpensive construction which will generate gas in such a manner that the entire amount of water passing from the apparatus will be completely ozonized.

A feature of the invention is the provision of a sight glass so that the operation of the interior parts may be readily viewed so as to convince the operator that the apparatus is properly working.

It is, of course, to be understood that the parts may be constructed and associated in other relations and the tube may be given other constructions than illustrated and associated with the other parts in other manners and, therefore, I do not desire to be limited in any manner except as set forth in the claims hereunto appended.

Having thus described my invention what I claim is:

1. An ozone generator for water purification comprising an ozone gas generator, having a water chamber, and a gas chamber, arranged concentrically of each other and means for passing water through the water chamber in a direction to be acted upon by the gas in the gas chamber.

2. An ozone generator for water purification comprising an ozone generator having a water chamber, and a gas chamber, and means for passing water through the water chamber in a direction to be acted upon by the gas in the gas chamber, and means for filtering water before same is passed to said generator, and means for mixing the water when charged with said ozone and a single means controlling the flow of water and generating action of said generator.

3. An ozone generator for the purification of water comprising an ozone generator having a water chamber, and a gas chamber, and means for passing water through the water chamber in a direction to be acted upon by the gas in the gas chamber, and means for filtering water before same is passed to said generator, and means for mixing the water when charged with said ozone, and means for first setting the generator into action and then allowing the flow of water to the generator.

4. An ozone generator for water purification comprising a casing, high frequency current generating devices arranged in the casing, an ozone generator arranged in circuit therewith and having a gas chamber and a water chamber, and a mixing compartment communicating with said chambers, and means for passing water into the water chamber, said means when initially operated controlling the operation of said devices.

5. An ozone generator for water purification comprising means for generating high frequency currents, a tube arranged in circuit therewith and having a water chamber, and a gas chamber communicating with each other at their discharge end, a valve controlling the flow of water to the water chamber, and a switch operated in the initial movement of the valve for setting said means into operation before the passage of water through the valve.

6. An ozone generator for water purification comprising means for generating high frequency currents, a tube arranged in circuit therewith and having a water chamber, and a gas chamber communicating with each other at their discharge end, a valve controlling the flow of water to the water chamber, and a switch operated in the initial movement of the valve for setting said means in operation before the passage of water through the valve, and means for mixing the water passing from said tube.

7. An ozone generator for water purification comprising a casing having a pair of upper compartments, a gas generating compartment, and a filtering compartment, high frequency current generating means in the upper compartments, a tube arranged in the gas compartment and in circuit with said means, and filtration means in said filtering compartment and in communication with said tube whereby water passing through the tube will be charged with gas.

8. An ozone generator for water purification comprising a casing having a pair of upper compartments, a gas generating compartment, and a filtering compartment, high frequency current generating means in the upper compartments, a tube arranged in the gas compartment and in circuit with said means, and filtration means in said filtering compartment and in communication with said tube whereby water passing through the tube will be charged with gas and mixed with ozone.

9. An ozone generator for water purification comprising a casing having a pair of upper compartments, a gas generating compartment, and a filtering compartment, high frequency current generating means in the upper compartments, a tube arranged in the gas compartment and in circuit with said means, and filtration means in said filtering compartment and in communication with said tube whereby water passing through the tube will be charged with gas, a valve controlling the flow of water from the filtering compartment to the tube, and a switch operated in the initial movement of the valve for setting into operation the first mentioned means.

10. An ozone generator for water purification comprising a tube constructed to have an electric discharging chamber, a gas chamber, and a water chamber, said gas chamber and water chamber having outlets in communication, a valve controlled means for passing filtered water into the water chamber, means for subjecting the tube to high frequency currents, and a switch controlling said means.

11. An ozone generator for water purification comprising a tube constructed to have an electric discharging chamber, a gas chamber, and a water chamber, said gas chamber and water chamber having outlets in communication, a valve controlled means for passing filtered water into the water chamber, means for subjecting the tube to high frequency currents, and a switch controlling said means, said switch being automatically operated in the initial movement of said second means.

12. An ozone generator for water purification comprising a casing divided into upper compartments, a gas generating compartment, a filtration compartment, high frequency generating means arranged in the upper compartments, a tube arranged in the gas generating compartment in circuit with said means, constructed to receive water and charge same with gas, a porous tube arranged in said filtration compartment to form a water chamber, and a filtration chamber, a pipe for passing water to the water chamber, and a valve controlling the flow of water from the filtration chamber to said tube.

13. An ozone generator for water purification comprising a casing divided into upper compartments, a gas generating compartment, a filtration compartment, high frequency generating means arranged in the upper compartments, a tube arranged in the gas generating compartment in circuit with said means constructed to receive water and charge same with gas, a porous tube arranged in said filtration compartment to form a water chamber, and a filtration chamber, a pipe for passing water to the water chamber, and a valve controlling the flow of water from the filtration chamber to said tube, and a lever projecting from the casing for operating the valve, and a switch associated with the lever that in the initial movement of the latter said first means is set into operation.

14. In an apparatus of the character described a tube provided with three walls forming an electric discharging chamber, a gas chamber, and a water chamber, said water chamber and said gas chamber having outlets in communication, and a pipe section having adjustable connection with the tube for passing water into the water compartment.

15. In an apparatus of the character described a tube constructed to have an electric discharge chamber, a water chamber, and a gas chamber in communication with the atmosphere at its upper end, having a tubular extension at its lower end, said tube having a mixing chamber enclosing said tubular extension whereby the passage of water will draw gas from said gas chamber.

16. In an apparatus of the character described a tube constructed to have an electric discharge chamber, a water chamber, and a gas chamber in communication with the atmosphere at its upper end, having a tubular extension at its lower end, said tube having a mixing chamber enclosing said tubular extension whereby the passage of water will draw gas from said gas chamber, and water conveying means having yieldable, adjustable connection with said tube for passing water to the water compartment.

In testimony whereof I affix my signature.

CHARLES LEO FITZ.